M. M. HOLLOWAY.
MEANS FOR ADVERTISING QUARTERS, LODGINGS, OR THE LIKE
APPLICATION FILED JAN. 5, 1920.

1,338,135.
Patented Apr. 27, 1920.
3 SHEETS—SHEET 1.

Inventor.
M. M. Holloway,
by Wilkinson & Giusta,
Attorneys.

M. M. HOLLOWAY.
MEANS FOR ADVERTISING QUARTERS, LODGINGS, OR THE LIKE.
APPLICATION FILED JAN. 5, 1920.

1,338,135.  
Patented Apr. 27, 1920.  
3 SHEETS—SHEET 2.

HOMOTEL

ROOM (MAP) NO. __1__ LOCATION __1875 G St. N.W.__
DESCRIPTION OF ROOM __S.W. Corner room, with Private Porch.__
SIZE __17' x 10'__ FLOOR __2nd__ ELEVATOR __No__ HOW HEATED __Hot Water__
BATH __Near by, semi-private__ GARAGE __Within 1 block.__ $1. per day.
MEALS __Not served__ PRICE for room with use of bath, per day $2 per wk $10
NAME OF PROPRIETOR __Mrs. Charles Homer.__
KIND OF ESTABLISHMENT __Private residence__ PHONE NO. __017 Main.__
HOW REACHED __F or G St. Cars.__
REMARKS __Spare room in private family, consisting of physician's widow and two grown daughters. No dogs or children taken. No meals served, but various hotels, restaurants and boarding houses near by.__

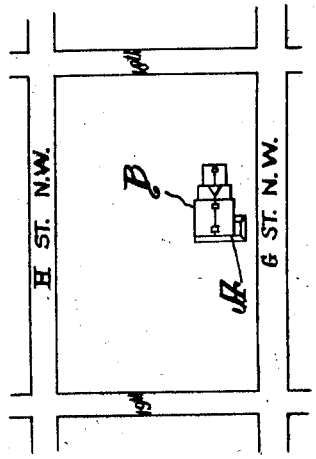

MAP OF SQUARE

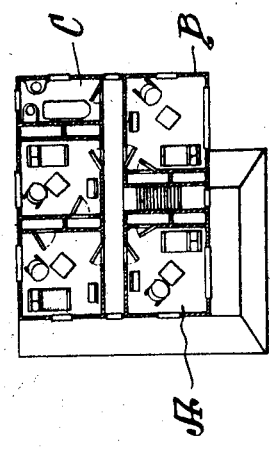

FLOOR PLAN

Fig. 2.

Inventor.  
M. M. Holloway.  
by Wilkinson + Fisher,  
Attorneys.

M. M. HOLLOWAY.
MEANS FOR ADVERTISING QUARTERS, LODGINGS, OR THE LIKE.
APPLICATION FILED JAN. 5, 1920.

1,338,135.

Patented Apr. 27, 1920.
3 SHEETS—SHEET 3.

Inventor.
M. M. Holloway.
by Wilkinson & Giusta,
Attorneys.

UNITED STATES PATENT OFFICE.

MADGE M. HOLLOWAY, OF MONTGOMERY, ALABAMA.

MEANS FOR ADVERTISING QUARTERS, LODGINGS, OR THE LIKE.

1,338,135.  Specification of Letters Patent.  Patented Apr. 27, 1920.

Application filed January 5, 1920. Serial No. 349,468.

*To all whom it may concern:*

Be it known that I, MADGE M. HOLLOWAY, a citizen of the United States, residing at Montgomery, in the county of Montgomery and State of Alabama, have invented certain new and useful Improvements in Means for Advertising Quarters, Lodgings, or the like; and I do hereby declare the following to be a full, clear, and exact description of the invention, such as will enable others skilled in the art to which it appertains to make and use the same.

My invention relates to means for advertising rooms, halls, or human habitations, or parts of habitations, which may be temporarily for rent, and especially where the tenant or lessee frequently changes.

The invention especially relates to apparatus or devices intended for use in an elastic system, whereby the quarters for rent may be quickly ascertained, and their quality and characteristics quickly noted, and whereby there may be a minimum amount of loss occasioned to the owner by failure to keep the quarters for rent duly occupied, and whereby the party renting the said quarters may be better able to secure them sooner, and hold them longer, or release them at a shorter period than originally contracted for, if desired.

My invention is especially intended to facilitate the renting of lodgings by advertising the renter:—

1st. as to the general location where the lodgings are;

2nd. the appearance of the house in which the lodgings are located;

3rd. the appearance and arrangement of the interior of the room or rooms;

4th. the comforts and conveniences available in connection with the room or rooms referred to, such as baths, telephones, etc.

5th. minute details as to the facilities for securing food or the like;

6th. proximity to the shopping districts, theaters, churches, or the like;

7th. garage facilities;

8th. means of transportation to and from the quarters referred to; and

9th. any other information of special interest to the prospective lodger or renter, in connection with the lodgings referred to.

The system is also intended to protect the owner or party letting out lodgings, as will be hereinafter described.

According to my invention as applied to the renting of lodgings, I provide in a central station or home office, hereinafter called "The homotel", a series of cabinets, or shelves, or drawers, preferably arranged in duplicate or triplicate sets, together with the other paraphernalia or apparatus hereinafter described.

In one cabinet or set of cabinets a card index system is arranged with special reference to the quarters available for rent. In another cabinet or set of cabinets is provided a similar set of cards containing the quarters that are then rented. In a third cabinet or set of cabinets I may place a similar set of cards that indicate quarters that are only rented at infrequent intervals, such as holidays, reunions, or the like.

In connection with these cabinets and card index systems hereinbefore referred to, I purpose using at the homotel a map of the city or portion of the city where the quarters referred to are for rent. In small towns the entire area may be covered by a single map, or by duplicate maps, whereas in larger cities the territory may be divided into sectional maps, each map being numbered to correspond to a portion of the city. In connection with these maps I use pins with colored heads, or thumb tacks with different colored heads adapted to indicate, respectively, the quarters that are occupied, those that are available for occupancy, and preferably also those that probably will be shortly available.

In addition to the foregoing devices, I also purpose to use at the homotel, in connection with the system, a book or books containing a series of registration and introduction cards or sheets arranged in duplicate and adapted to form a duplicate record of the particulars of the transaction as will be hereinafter more fully described.

The homotel should, of course, be provided with the usual telephone facilities.

My invention will be more fully understood after reference to the accompanying drawings, in which like parts are indicated by similar reference symbols throughout the several views, and in which:—

Fig. 3 shows the rear face of said sheet of cardboard containing the data with regard to the house and room to be rented, and also shows a floor plan of the house showing the room or rooms to be rented, and also the location as far as the block is concerned in which the house is located.

Figure 1:
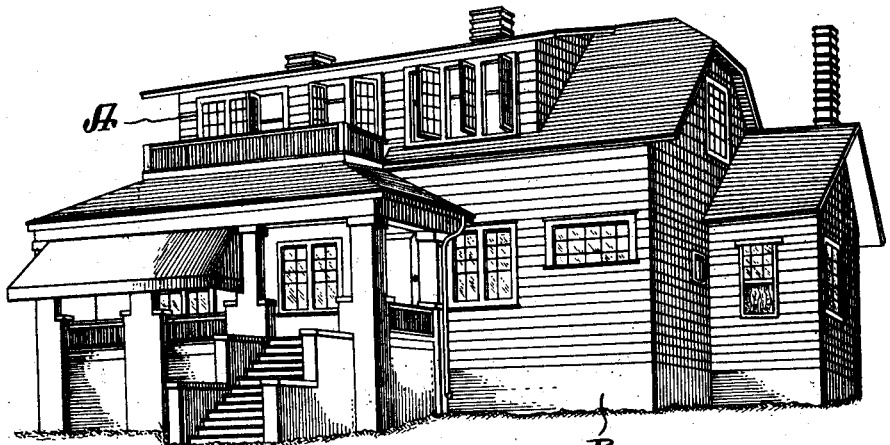
Figures 1 and 2 show the front side of the cardboard sheet or the like illustrative of the exterior of the house, and the room to be rented therein.

Referring more in detail to the figures briefly referred to, Fig. 1 shows the exterior of the house indicated by B, in which the room A is subject to rent. In the lower left-hand corner of Fig. 3 is shown a plan of that floor of the house on which the room for rent is located, and which indicates that the corner room opens on a private porch, and is provided with suitable closets, and opens into a hall, and is of convenient access to the bath room indicated by C. In the lower right-hand corner of Fig. 3 is shown the square of the city in which the house is located, with the four streets bounding the square indicated in this case by H street on the north, G street on the south, 18th street on the east and 19th street on the west.

Figure 6:
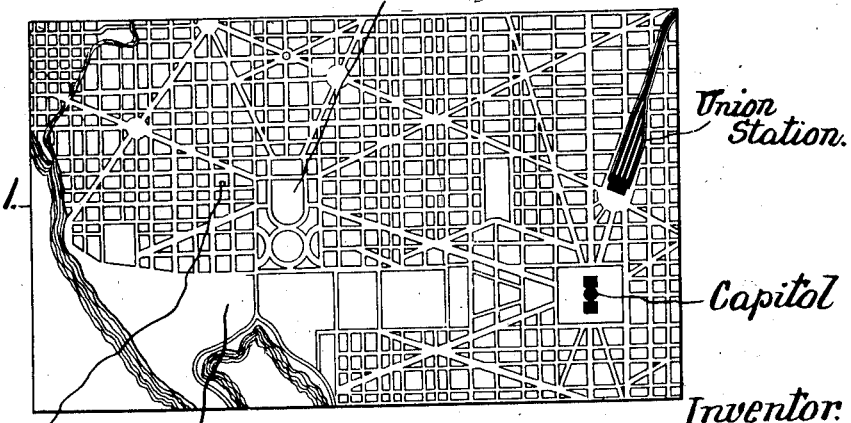
Fig. 6 is a typical view of a portion of a city showing the location of the square in which the lodgings may be found, together with other objects of interest nearby.

The location of the square and house are further shown in Fig. 6, which represents a map of a portion of the city of Washington, and shows a house that is located on G street near the White House grounds and the Mall. The map also shows the Capitol, the Union Station and other prominent features of the city. This map is merely typical of any city, and in small cities a single map will be sufficient to illustrate the entire city, while in larger cities maps should preferably be made in sections. These maps or sections of maps may be properly backed, but are preferably mounted on a board or boards and hung on a wall or placed on a table or shelf so that pins or thumb tacks may be inserted and removed without injuring the map.

A single map may be used with pins or thumb tacks having different colored heads, for instance, it may be desirable to use red-headed pins to indicate quarters that are for rent, blue-headed pins for quarters that are already rented, and yellow-headed pins for quarters that are shortly to be released, and green-headed pins for quarters that are subject to be rented infrequently, such, for instance, as when crowds are expected in the city as reunions, conventions, or the like.

By having such a map or such maps conveniently located with the different colored pins referred to, both the agent and the prospective lodger can determine at a glance whether quarters can be had in or near the desired locality, or whether such quarters are likely to be available at an early date, or can be secured only in case of emergency.

As a further guide, different shades of the same color may be used to indicate cheaper or more expensive rooms, thus dark red may indicate high-priced rooms, and light pink cheap rooms; and similarly with the other colors mentioned. Having noted on the map the desired location and whether cheap or high-priced rooms are available in or near that location, the agent then goes to the proper cabinet and pulls out the cards which have on the front the picture of the house, a photograph of the interior of the room, and as shown in Figs. 1 and 2 there appear on the back the data shown in Fig. 3.

There may be a number of these cards showing quarters available, and the renter may be given more or less choice in selecting quarters after determining from a hurried inspection whether the house is of the proper appearance, and the right neighborhood, and is accessible to car lines, or means of transport.

Figure 2:
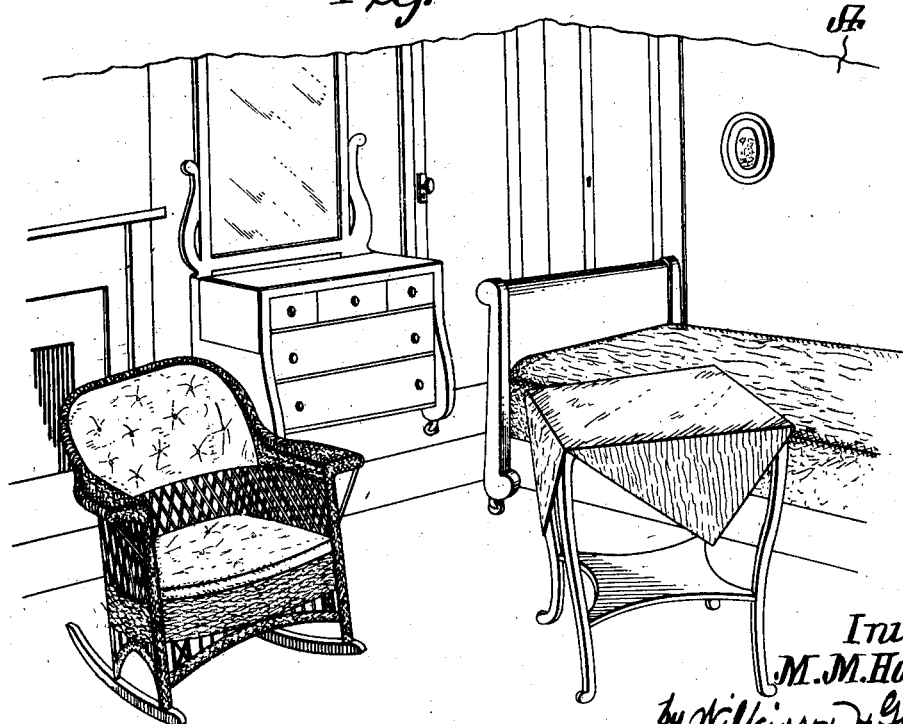

If the general data shown in Figs. 1 and 2, and at the bottom of Fig. 3 are satisfactory the applicant may then examine the data filled in at the top of Fig. 3, which give more of the details with regard to the quarters for rent than could be had from a mere inspection of the drawings or photographs referred to. For instance, Fig. 3 shows that the house in which the room is for rent may be found on map No. 1, that the house is located at 1875 G street, N. W., that the room is a southwest corner room 17 feet by 18 feet, with a private porch, that the room is on the second floor, there is no elevator and that there is hot water heat; that there is nearby a semi-private bath, that there is a garage within 1 block, the cost being $1.00 per day; that meals are not served, and that the price of the room with bath is $3.00 per day of $18.00 per week; the name of the proprietor is Mrs. Charles Homer, the establishment is a private residence, that the telephone is 017 Main, that the house may be reached by either the F or the G street cars. With regard to special details a blank space is left to be filled in with such memoranda, as that the room is a spare room in a private family consisting of a physician's widow and two grown daughters, that no dogs or children are taken, that no meals are served but that various hotels, restaurants and boarding houses nearby furnish meals at varying prices, etc.

These cards are printed, of course, in multiple, and these data filled in for each house and room or rooms to be rented; a photograph of the house and of the room being pasted on the front of the card, and the other data referred to being written in or otherwise applied on the back of the card.

Figure 4:
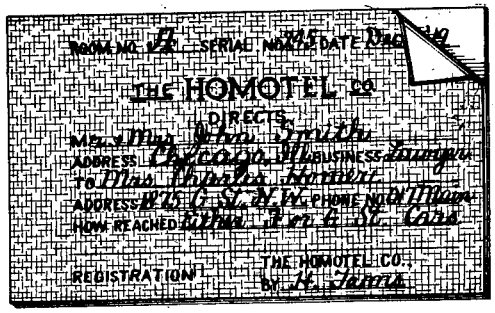
Fig. 4 shows the top or registration sheet of a book used in the system.
Figure 5:
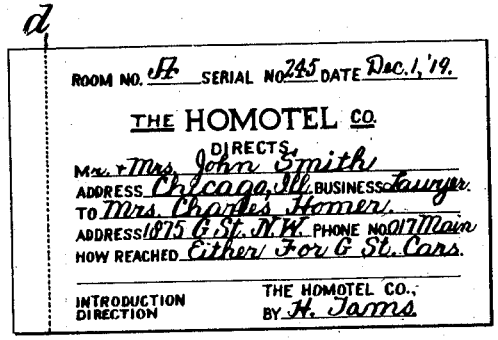
Fig. 5 shows a lower sheet to which the data entered on the top sheet are transferred.

The applicant having satisfied himself or herself as to the desirability of the quarters to be rented, and that the price is satisfactory, the agent then writes on the top sheet of the registration and introduction book, shown in Fig. 4, such details as may be desired, and an imprint is made on the sheet beneath by any suitable means, as by the use of carbon paper, and this lower sheet is shown in Fig. 5.

These two sheets show that Mr. and Mrs. John Smith, whose address is Chicago, Ill., and his business is that of a lawyer, have engaged room A, Ser. No. 245, that being the serial number on the books of The Homotel Co., and that the room has been engaged from a date, say December 1, 1919, at the address of Mrs. Charles Homer, which is 1875 G street, N. W., phone No. 017 Main, whose house may be reached by the F or G street cars; and the signature or initials of the agent, H. Tams, is added.

The top sheet of each pair is preferably retained in a book as a permanent record, and the other sheet, for instance the lower, is torn off along the perforated portion $d$, and the main portion of the sheet is handed to the lodger to be delivered to the proprietess of the establishment referred to. After this is done, the agent preferably should telephone to the proprietress referred to, advising her that the room has been rented by said party from the date mentioned.

For all of these services The Homotel Company will charge a price agreed upon, presumably a small percentage of the renting price of the quarters rented. Where a small commission only is charged, it would obviously be to the proprietor's interest to keep The Homotel Company posted as to when the quarters are vacant, or when they are to be vacated, so that other lodgers may be secured and provided for.

In case The Homotel Company notes that the quarters are apparently occupied for a long time, which can be determined from the map and the card system hereinbefore referred to, it can ascertain by telephone or otherwise whether the quarters are still occupied, or still for rent, why its commission has not been paid, etc., and thus the system affords a check also on the honesty of the landlord or landlady with regard to his or her dealings with The Homotel Co., and indirectly also with his or her further dealings with the lodger.

In order to facilitate the operation of the system, it may be preferable to provide in the "For rent" cabinet, or cabinets, duplicate cards so that the presence of a single card only in that cabinet would indicate that the duplicate card might be found in the cabinet or cabinets marked "Rented", while a permanent record could be kept in the "For rent" cabinet of all the quarters for rent, whether rented or not, and at the same time the presence of a single card only would indicate to the agent that those particular quarters had been rented at that particular time, and he could refer either to the rented cabinet or to the map to ascertain whether those particular quarters are likely to be available again at an early date.

To recapitulate, the operation of the system is as follows:—

The applicant for quarters goes to The Homotel Company at its central office and asks for a room at or near a certain price and at or near a certain location. The agent examines the map, with or without the assistance of the applicant, and notes what quarters are available or what are likely to be available in the near future, and then pulls out the cards corresponding to Figs. 1 to 3, and after the applicant has selected any particular room or set of rooms, the agent then writes out the details in the registration and introduction book shown in Figs. 4 and 5, and hands the applicant the registration card which contains a memoranda of how the quarters can be reached. Such written instructions, of course, may be modified, if desired; but in any event there is a written memorandum of a contract made between the applicant and the agent, and by delivering the card handed to him the applicant renders himself liable as a party to this contract. The applicant, of course, may be required to sign a suitable registry book, which is ordinarily provided at hotels, if desired.

When the applicant gives notice of leaving, the landlord or landlady telephones to The Homotel Co. that the quarters referred to are about to be vacated, or will be vacated at a certain time, and the cycle of operations is repeated.

It will be obvious that various details in the herein described apparatus, and in connection with preparing and using same, may be used without departing from the spirit of my invention; and I do not mean to limit the invention to such details except as particularly pointed out in the claims.

Among such modifications may be mentioned placing the data shown in Fig. 3 on a separate card or cards from the photographs shown in Figs. 1 and 2; in which case it may be practicable to give even more complete data as to the quarters offered for rent.

Also, duplicate or triplicate maps may be used to show on one map the quarters for rent immediately, on another map the quarters rented, and on a third map the quarters that may be available at some predetermined future time, etc.

Furthermore, by the use of code letters or words, the homotel may convey private information to the proprietor or proprietress by memoranda made on the registration card and incidentally duplicated on the introduction card, such for instance as "This party is good pay," or "Poor pay, call for cash in advance," or the like.

In this and in practically all of the features of the system as proposed the applicant is free to select for himself or herself the quarters, price, etc., without wasting time over the selection, and there is a permanent written record made in duplicate of essentials of the transaction, one copy to be retained at the homotel, and the other copy to be retained by the party letting the quarters, while the lodger makes himself or herself a party to the transaction by delivering the duplicate or "address" card.

Thus questions arising from real or alleged misunderstanding of verbal statements will be in a large measure avoided, and checks upon the honesty and fair dealing of all parties concerned may be secured.

Any comments or complaints made to the homotel by the lodger or lodgers with regard to the accommodations furnished, the courtesy extended, or the treatment rendered at the quarters rented may also be noted in private cipher at the homotel on any one of the sheet or sheets bearing Figs. 1, 2 and 3, and thus the homotel may keep a convenient private record of what future guests may expect at the quarters referred to.

The foregoing sets out some only of the many advantages derived from the use of the apparatus hereinbefore described.

Having thus described my invention what I claim and desire to secure by Letters Patent of the United States is:—

1. Apparatus for advertising quarters, lodgings, or the like, comprising a series of stiff sheets each having on one face thereof visual representations of the house and room or rooms for rent, and on the other face of each sheet descriptive data of the location and characteristics of the house and quarters shown on the obverse face of said sheet, a series of cards bound together in pairs to form a book, with copying material interposed between the members of each pair, the two cards of each pair being provided with printed matter, and with a series of registering blank spaces adapted to be filled in at a single operation and to form with said printed matter duplicate records of the transaction of renting said property, the two cards having otherwise distinctive characteristics, and one of the corresponding members of each pair being made detachable from said book, to be handed to the renter, and the other to be retained as a record by the agent, substantially as described.

2. Apparatus for advertising quarters, lodgings, or the like, comprising a series of stiff sheets each having on one face thereof visual representations of the house and room or rooms for rent, and on the other face of each sheet descriptive data of the location and characteristics of the house and quarters shown on the obverse face of said sheet, a series of cards bound together in pairs to form a book, with copying material interposed between the members of each pair, the two cards of each pair being provided with printed matter, and with a series of registering blank spaces adapted to be filled in at a single operation and to form with said printed matter duplicate records of the transaction of renting said property, the two cards having otherwise distinctive characteristics, and one of the corresponding members of each pair being made detachable from said book, to be handed to the renter, and the other to be retained as a record by the agent, with a map of the city or town or of the portion of the city or town, in which the various properties for rent are located, adapted to be marked to indicate the locations of the various properties for rent, and the status as to whether rented or available for rent of each individual property, substantially as described.

3. Apparatus for advertising quarters, lodgings, or the like, comprising a series of stiff sheets each having on one face thereof visual representations of the house and room or rooms for rent, and on the other face of each sheet descriptive data of the location and characteristics of the house and quarters shown on the obverse face of said sheet, said data comprising a detailed statement of the conditions and accommodations offered for rent, and a plan view of the floor on which the particular quarters offered for rent are shown, a series of cards bound together in pairs to form a book, with copying material interposed between the members of each pair, the two cards of each pair being provided with printed matter, and with a series of registering blank spaces adapted to be filled in at a single operation and to form with said printed matter duplicate records of the transaction of renting said property, the two cards having otherwise distinctive characteristics, and one of the corresponding members of each pair being made detachable from said book, to be handed to the renter, and the other to be retained as a record by the agent, substantially as described.

4. Apparatus for advertising quarters, lodgings, or the like, comprising a series of stiff sheets each having on one face thereof visual representations of the house and room or rooms for rent, and on the other face of each sheet descriptive data of the location and characteristics of the house and quarters shown on the obverse face of said sheet, said data comprising a detailed statement of the conditions and accommodations offered for rent, and a plan view of the floor on which the particular quarters offered for rent are shown, a series of cards bound together in pairs to form a book, with copying material interposed between the members of each pair, the two cards of each pair being provided with printed matter, and with a series of registering blank spaces adapted to be filled in at a single operation and to form with said printed matter duplicate records of the transaction of renting said property, the two cards having otherwise distinctive characteristics, and one of the corresponding members of each pair being made detachable from said book, to be handed to the renter, and the other to be retained as a record by the agent, with a map of the city or town or of the portion of the city or town, in which the various properties for rent are located, adapted to be marked to indicate the locations of the various properties for rent, and the status as to whether rented or available for rent of each individual property, substantially as described.

MADGE M. HOLLOWAY.